United States Patent [19]

Leonberger et al.

[11] Patent Number: 4,518,219
[45] Date of Patent: May 21, 1985

[54] OPTICAL GUIDED WAVE DEVICES EMPLOYING SEMICONDUCTOR-INSULATOR STRUCTURES

[75] Inventors: Frederick J. Leonberger, Lexington; Ivars Melngailis, Newton; Carl O. Bozler, Sudbury; Robert W. McClelland, Weymouth, all of Mass.

[73] Assignee: Massachusetts Institute of Technology, Cambridge, Mass.

[21] Appl. No.: 463,568

[22] Filed: Feb. 3, 1983

Related U.S. Application Data

[62] Division of Ser. No. 115,420, Jan. 25, 1980, Pat. No. 4,420,873.

[51] Int. Cl.³ .............................................. G02B 5/174
[52] U.S. Cl. .................... 350/96.12; 350/96.18; 350/96.19
[58] Field of Search ............... 350/96.11, 96.12, 96.13, 350/96.14, 96.18, 96.19; 357/17, 19, 20

[56] References Cited

U.S. PATENT DOCUMENTS

| 3,948,583 | 4/1976 | Tien | 350/96.11 X |
| 4,066,482 | 1/1978 | Shaw | 350/96.11 X |
| 4,070,516 | 1/1978 | Kaiser | 350/96.12 X |
| 4,124,270 | 11/1978 | Cheo | 350/96.12 |

FOREIGN PATENT DOCUMENTS 54-34847 3/1979 Japan ............................. 350/96.12

OTHER PUBLICATIONS

Samid et al, "Embedded Heterostructure Epitaxy: A Technique For ...", ..., *Appl. Phys. Lett.*, vol. 27, No. 7, Oct. 1975, pp. 405–407.
Hatakoshi et al, "Optical Waveguide Lenses," *Optica Acta*, vol. 26, No. 8, Aug. 1979, pp. 961–968.

*Primary Examiner*—John Lee
*Attorney, Agent, or Firm*—Arthur A. Smith, Jr.; David E. Brook; Leo R. Reynolds

[57] ABSTRACT

A three-dimensional optical waveguide is disclosed. This waveguide comprises a single crystal semiconductor layer grown upon an insulator which has an index of refraction lower than the semiconductor. The semiconductor layer has a thickness which provides confinement of light propagating in the semiconductor layer in the vertical direction. An effective larger index of refraction over a cross-sectional region of the semiconductor layer provides confinement of light in the lateral direction. This lateral confinement is achieved by side walls in the semiconductor layer which extend toward, but fall short of, the insulator layer.

17 Claims, 19 Drawing Figures

OPTICAL GUIDED WAVE DEVICES EMPLOYING SEMICONDUCTOR-INSULATOR STRUCTURES

GOVERNMENT SUPPORT

Work described herein was supported by the U.S. Air Force.

This application is a division of application Ser. No. 115,420, filed 1/25/80 now U.S. Pat. No. 4,420,873.

TECHNICAL FIELD

This invention is in the field of optics, particularly integrated optics.

BACKGROUND ART

Light is presently being widely investigated, and to a lesser extent actually employed, in many applications as a replacement for electrical signals. Examples include optical communication, optical data transmission, and optical signal processing.

In all of these systems, the basic component is an optical waveguide. One of the simplest waveguides is referred to as a planar waveguide and has a sandwich structure wherein the center of the sandwich is a thin film having a height of the order of the propagating light wavelength and an index of refraction which is greater than that of the layers surrounding it. This makes possible total internal reflection which is the mechanism that causes the light to be confined within the waveguide.

Planar waveguides confine light in only one dimension, the height. It is also necessary for many waveguide devices to confine light in another direction, the lateral direction. This allows the guided light to be steered around curves and serves as the basis for a variety of proposed integrated optical circuits. Usually, confinement in the lateral direction is achieved by tailoring the device so that a larger effective refractive index exists over a three-dimensional region comprising the waveguide. Such waveguides are generally referred to as three-dimensional waveguides.

Much of the research effort directed to producing optical waveguides from semiconductor layers has been focused upon gallium arsenide and other III-V compounds. This is due to the fact that some of these materials are very versatile. In fact, all the important functions, including light generation, guiding, modulation and detection, have been achieved in gallium arsenide based materials.

One form of optical waveguide which has been fabricated with gallium aresenide is based upon the fact that conduction electrons or holes make a negative contribution to the dielectric constant, thus decreasing the index of refraction. Thus, an optical waveguide might be formed with the gallium arsenide substrate doped with a high electron concentration (n+) with a guiding layer of gallium arsenide deposited thereon which has a low electron concentration (n−). In such devices, index differences as large as tenths of a percent have been achieved and found to be sufficient to produce total internal reflection.

Gallium arsenide waveguides have also been produced from heterostructures, such as a single layer of GaAs deposited upon a $Ga_{1-x}Al_xAs$ substrate.

Despite the success which has been achieved with gallium arsenide optical waveguides, such devices have had problems. One of these problems is the high propagation loss which results as light propagates through the light guiding layer. There is invariably a portion of the light which leaks into the substrate material which is lossy.

Another deficiency of previously existing gallium arsenide optical waveguides is their inability to guide light through sharp bends or direction changes without concomitant high loss.

DISCLOSURE OF THE INVENTION

This invention relates to the fabrication of optical waveguides, particularly three-dimensional optical waveguides, from semiconductors grown over insulators.

In one embodiment, a three-dimensional optical waveguide is fabricated by growing a single crystal semiconductor layer from a material, such as gallium arsenide upon an insulator. Insulators, such as certain oxides, have lower indices of refraction than typical semiconductors. The semiconductor layer is grown to a thickness suitable to provide confinement of light in the vertical direction within the semiconductor film. An effective larger index of refraction over a region of the semiconductor layer is then created to provide confinement of light in the lateral direction. The growth of the single crystal semiconductor is preferably carried out using a vapor-phase lateral epitaxial overgrowth technique in which the semiconductor is grown epitaxially to the substrate under conditions which produce growth preferentially in the lateral direction out over the insulator.

A wide variety of three-dimensional waveguides can be produced once the single crystal semiconductor layer is grown upon the insulator. In general, any of the known structures for confining light within the semiconductor layer in a lateral direction are suitable. Examples of such structures include a rib, inverted rib, metal gap, ridge, p-n junction, or embedded stripe.

The optical waveguide produced according to this invention can have smaller allowable bend radii than have heretofore been possible, and have exhibited lower losses than previously reported. The semiconductor-over-insulator structure additionally forms the basis for a new class of semiconductor optical guided wave devices, such as waveguide lenses, gratings and electrooptic modulators.

BEST MODES OF CARRYING OUT THE INVENTION

The invention will now be described in more detail with particular reference to the Figures.

FIG. 1 illustrates a vapor-phase lateral epitaxial overgrowth technique particularly useful in forming the devices described herein. In FIG. 1(A), single crystal gallium arsenide substrate 10 is coated with a layer of silicon dioxide 12, as shown. Gallium arsenide substrate 10 might comprise, for example, a single crystal wafer having dimensions of 1 cm. × 1 cm. and being of arbitrary doping. The thickness of this wafer might typically be 0.2 mm. Silicon dioxide layer 12 might originally be deposited bu pyrolytic deposition or vacuum techniques to cover the entire top surface of substrate 10 with a thickness of 3000 Å. The orientation of the substrate surface is (110). Narrow slots 14 are etched through silicon dioxide layer 12 to expose gallium arsenide substrate 10. Slots 14 might be formed by photolithographic and chemical etching techniques, and the slots 14 are oriented 80° off the (110) cleavage plane of substrate 10.

In order to grow a layer of gallium arsenide over the silicon dioxide layer which is epitaxial to substrate 10, it is necessary that growth initiate up through etched slots 14 and subsequently across the surface of silicon dioxide layer 12. This requires preferential growth in the lateral direction compared to the vertical direction. Such preferential lateral growth can be obtained by selection of appropriate growth conditions, crystallographic orientation for substrate 10, and orientation of slots 14. These crystal growth conditions include temperature, flow rates, concentrations, growth time, etc.

It is preferable that the ratio of lateral-to-vertical growth rates be about 10 or above for the fabrication of most devices according to this invention. Ratios of about 25 have been achieved, and it is believed that even higher ratios are possible under proper growth conditions and with appropriate substrate and slot orientations.

Figure 1A:
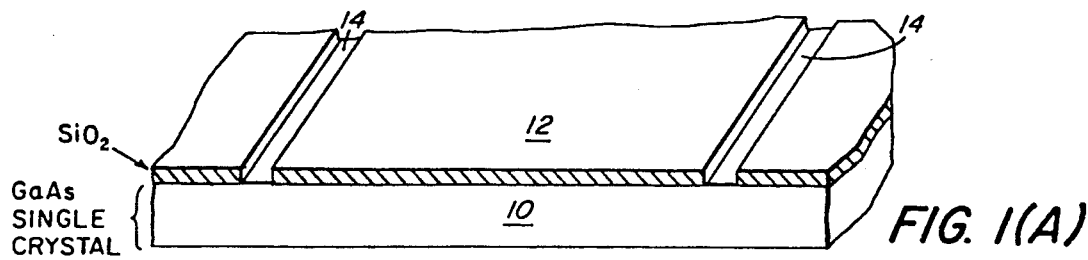
FIGS. 1(A)–1(D) present a series of partial perspective views of the growth of a semiconductor layer over an insulating layer by a vapor-phase epitaxial overgrowth technique.
Figure 1B:
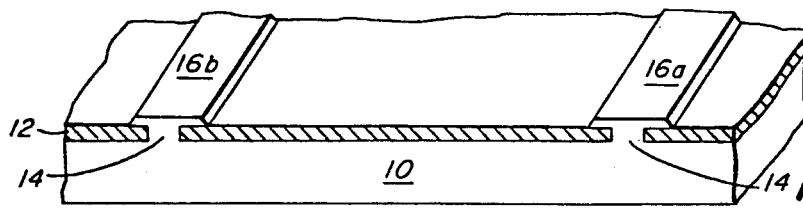

As illustrated in FIG. 1(B), use of a vapor-phase lateral epitaxial overgrowth technique produces growth up through slots 14 and subsequently outwardly in the lateral direction resulting in semiconductor overgrowth layers 16a and 16b.

Figure 1C:
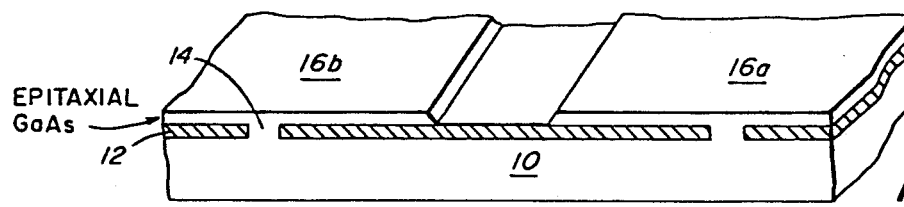
Figure 1D:
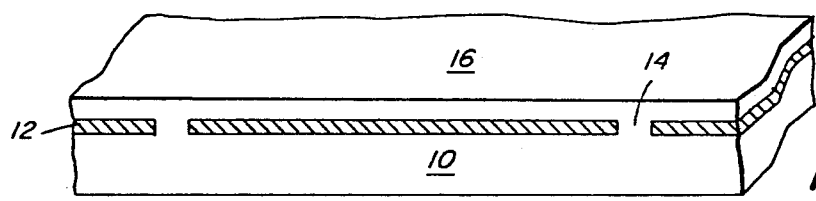

If growth conditions are continued, layers 16a and 16b continue their lateral growth as illustrated in FIG. 1(C). Continued growth results in a joining of layers 16a and 16b to form a continuous overgrown gallium arsenide layer 16, as illustrated in FIG. 1(D). Although most of the devices described hereinafter do have such a continuous overgrown layer, this is not necessary in all cases. Overgrown layers, such as layers 16a and 16b illustrated in FIG. 1(C) can also be employed to form waveguides.

Figure 2:
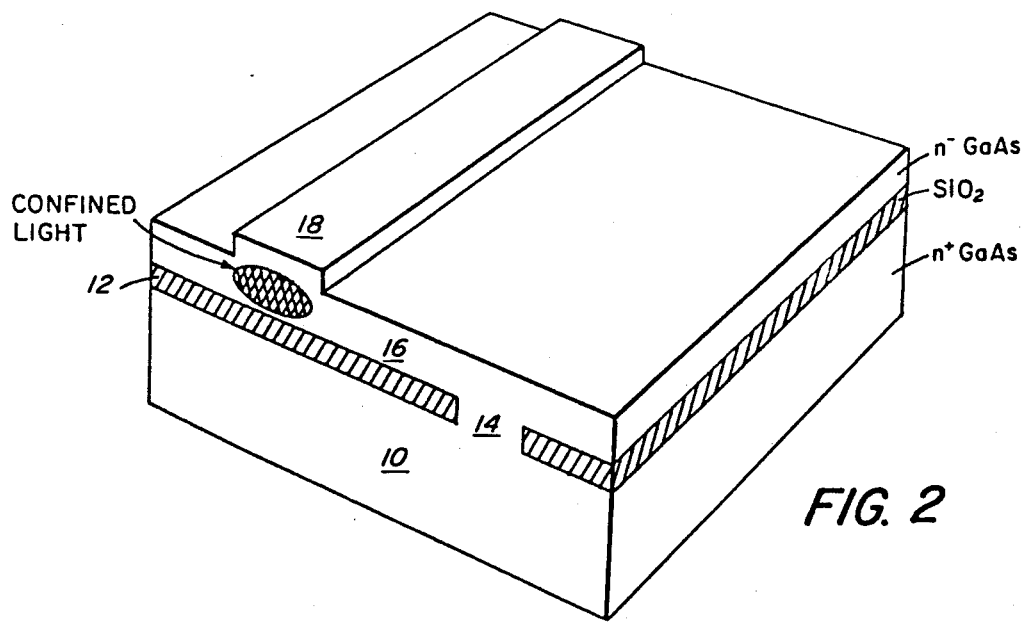
FIG. 2 is a perspective view of a three-dimensional optical rib waveguide produced according to this invention.

FIG. 2 illustrates one embodiment of a three-dimensional optical waveguide according to this invention. This waveguide includes gallium arsenide substrate 10, doped with n-type dopants to a carrier concentration of about $1 \times 10^{18}$ cm$^{-3}$. Substrate 10 was initially coated with silicon dioxide layer 12, about 3000 Å thick. Slot 14 was then etched through silicon dioxide layer 12, after which active gallium arsenide semiconductor layer 16 was grown using a vapor-phase lateral epitaxial overgrowth technique. Active gallium arsenide layer 16 is doped with n-type dopants to a carrier concentration of about $3 \times 10^{14}$ cm$^{-3}$. Rib 18, which might have a height of 1 μm and a width of 6 μm, is then formed by etching away gallium arsenide active layer 16 in areas except where rib 18 is located. Light is confined to an area under the rib 18 as illustrated by the cross-hatched area. This light is confined in the vertical direction by the boundaries between active gallium arsenide 16 and the silicon dioxide layer 12 on one side and air on the other side. Lateral confinement is achieved by rib 18 which produces an effective index of refraction which is greater under rib 18 than at other areas in active gallium arsenide layer 16.

A three-dimensional rib waveguide similar to that illustrated in FIG. 2 was produced using a [110]-oriented n+ (n=$1 \times 10^{18}$ cm$^{-3}$) single crystal substrate. This substrate was cleaned and given a brief chemical etch and then a 3000 Å-thick pyrolytic silicon dioxide (SiO$_2$) layer was deposited at 400° C. Stripe openings in the oxide, running the 1 cm length of the sample, 8 μm wide on 120 μm centers, were then formed by conventional photolithographic and chemical etching techniques. These stripe openings were oriented 10° from the normal to the [110] cleavage plane. The GaAs wafer was then placed in an AsCl$_3$-Ga-H$_2$ vapor phase epitaxial growth system and a 4 μm-thick undoped (n=$3 \times 10^{14}$ cm$^{-3}$) layer was grown. Proper selection of growth conditions produced a 10:1 lateral-to-vertical growth rate ratio so that epitaxial stripes 80 μm wide were formed. Waveguides were then formed by evaporating a 400 Å thick Ti layer over the wafer and patterning it with conventional photolithographic and chemical etching techniques to form 6 μm-wide stripes on 240 μm center on the GaAs (i.e., on every other GaAs stripe) that were parallel to but away from the oxide stripes. Using a chemical etching technique, the GaAs was then etched down 1 μm (except where the Ti remained) to form rib waveguides. The remaining Ti was then removed by a chemical etch, the ends of the crystal cleaved and the sample was mounted for testing.

The waveguides were tested using end-fire coupling at 1.06 μm with a Nd:YAG laser. In this technique, laser light is focused on the cleaved input face of the waveguide and the guided light emerging from the guide output face is imaged on a detector or image sensor. The guides were observed to be the desired single-mode types by forming a magnified image of the guide output face on a vidicon attached to a television monitor. Quantitative loss measurements were made by measuring the relative transmission through several waveguides for three different lengths of the same wafer using a sample-in sample-out technique. For this case, measurements were made on the original guide length of 9.5 mm and on cleaved lengths of 3.5 and 6 mm. For each sample length, each guide was measured several times and average values for the transmission obtained. Individual values of transmission generally were within 10% of these average values. A plot of the logarithm of the transmission vs the guide length yielded an attenuation coefficient for each waveguide. The average of these attenuation measurements was 0.054 cm$^{-1}$ or 2.3 dB/cm and 0.63 cm$^{-1}$ or 2.7 dB/cm for TE and TM polarized input light respectively. These values are about 2 dB/cm lower than any previously reported for GaAs three-dimensional optical waveguides and are within 1 dB/cm of theoretical expectations. This deviation from theory can probably be explained by scattering at the rib edge. Such scattering can in principle be reduced either by modifying the rib waveguide fabrication technique or by forming other types of three-dimensional waveguides.

FIGS. 3–7 are cross-sectional views illustrating alternative embodiments of three-dimensional optical waveguide constructions according to this invention. Slots 14 have been omitted for convenience from these Figures, as well as subsequent Figures.

Figure 3:
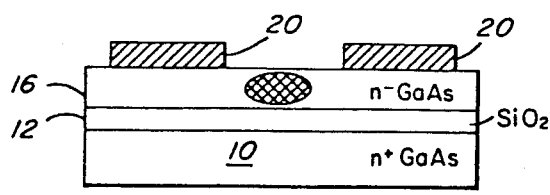
FIGS. 3–7 are cross-sectional views illustrating alternative embodiments of three-dimensional optical waveguides according to this invention.

In FIG. 3, the three-dimensional optical waveguide has gallium arsenide substrate 10, silicon dioxide overcoat 12, and gallium arsenide active layer 16 similar to the device of FIG. 2. Lateral confinement of the light is achieved in this device, however, by two metal stripes 20, which typically might be 5 μm wide and 1 μm high and formed from metals such as Au, Pt, or Ni.

Figure 4:
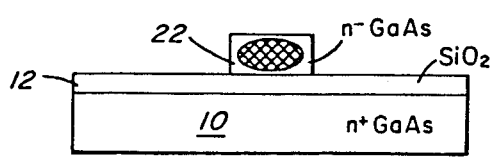

FIG. 4 illustrates another embodiment of a three-dimensional optical waveguide also having a substrate 10 and silicon dioxide layer 12 as previously described. In this embodiment, however, active gallium arsenide layer 16 has been completely etched away, except for the area forming ridge 22. In such a ridge waveguide, light is confined within ridge 22, as illustrated. Ridge 22 might have dimensions of 1 μm × 1 μm.

Figure 5:
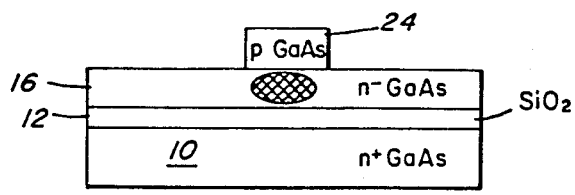

FIG. 5 illustrates yet another embodiment of a three-dimensional optical waveguide which can be formed according to the method described herein. In this embodiment, active gallium arsenide layer 16 has an area doped with n-type dopants to a carrier concentration of about $3 \times 10^{14}$ cm$^{-3}$. Rib 24 is formed by etching active layers 16 on both sides of rib 24. Rib 24 is doped with p-type dopants to a carrier concentration of about $1 \times 10^{18}$ cm$^{-3}$. Thus, a p-n junction is formed immediately beneath rib 24. Light confinement is achieved in gallium arsenide active layer 16 immediately under rib 24 as illustrated.

Figure 6:
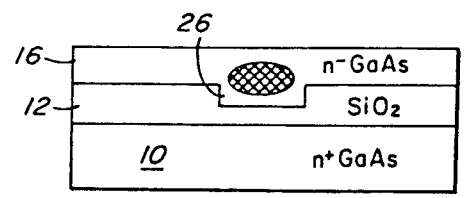

FIG. 6 illustrates an optical waveguide embodiment in which lateral confinement of light is achieved by inverted rib 26. This can be formed by etching a groove in silicon dioxide layer 12 to a depth of about 0.5 μm and a width of about 3 μm. Active gallium arsenide layer 16 can then be grown over silicon dioxide layer 12 by a vapor-phase lateral epitaxial overgrowth technique described above. Light is confined immediately above inverted rib 26 in active layer 16 as illustrated.

Figure 7:
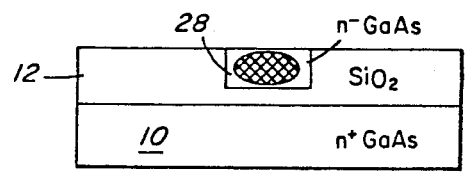

FIG. 7 illustrates an embedded stripe waveguide which can be formed similarly to the inverted rib waveguide of FIG. 6, except that the overgrown gallium arsenide layer 16 is subsequently etched away at all areas except embedded stripe 28 within oxide 12. Light is confined within embedded stripe 28 as illustrated. This structure is particularly attractive because of its outstanding potential for very low loss and the capability of extending this structure to three-dimensional integrated optical circuits. This embodiment is expected to produce very low loss, and tight low-loss bends because of the excellent confining properties of the oxide layer.

Figure 8:
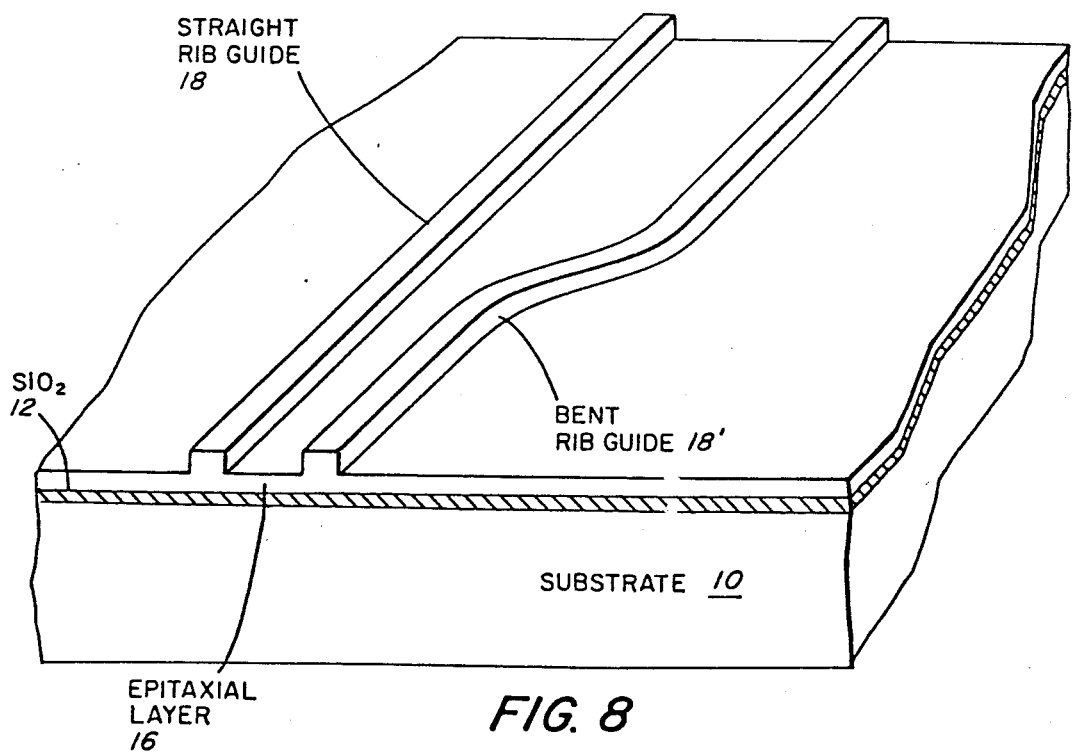
FIG. 8 is a perspective view of a device having two rib waveguides, one of which undergoes two bends.

FIG. 8 illustrates a device formed from substrate 10, silicon dioxide layer 12 and overgrown layer 16. The latter has been etched to provide ribs 18 and 18'. Rib 18 confines light so that it travels parallel to the direction in which the light is launched. Rib 18', on the other hand, contains two bends which function to change the direction of light propagating in rib 18'.

Three-dimensional optical waveguides according to this invention can be fabricated to contain bends, such as those in rib 18', and light can be caused to bend at a very tight radius (1 mm) with only low loss.

Figure 9:
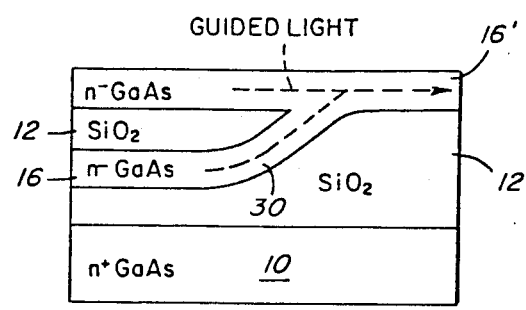
FIG. 9 is a cut-away side view of a device according to this invention and illustrating an interconnect between levels in a two-level waveguide circuit.

FIG. 9 is a cut-away side view of a device suitable for providing interconnections in multilevel integrated optical circuits, which are truly three-dimensional circuits. Thus, channel 30 within oxide coating 12 is employed to guide light from one active gallium arsenide layer 16 to another active layer 16' on a different circuit level. Light from each channel is combined at the junction.

It will be recognized, of course, that many of the optical waveguides described herein can be employed in more complex structures to serve as optical directional couplers, electro-optic switches, and interferometric modulators.

Figure 10:
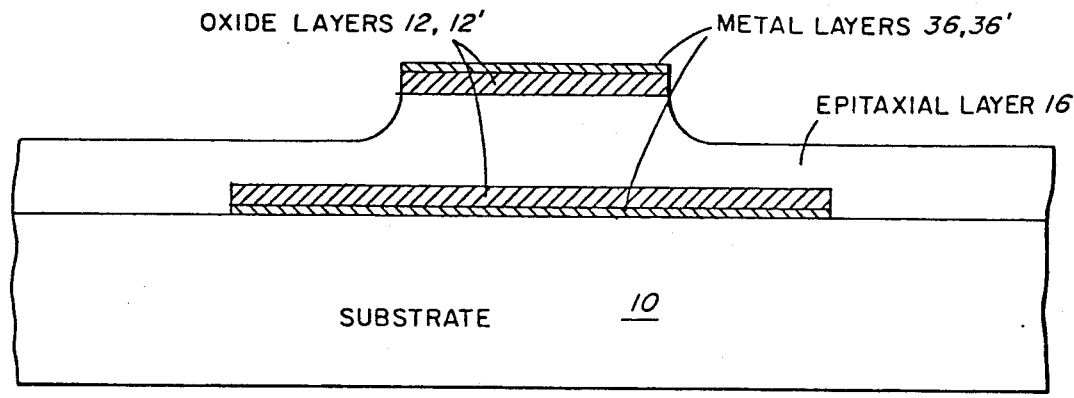
FIG. 10 is a cross-sectional view of an electro-optic modulator suitable for an optical and microwave waveguide which is based upon a three-dimensional optical waveguide according to this invention.

FIG. 10 illustrates a high speed electro-optic modulator based upon a three-dimensional optical waveguide as described above. This device acts both as an optical waveguide and a microwave waveguide, with the propagation speed for each being the same and attenuation losses for each being low. The guide is shown in cross-section and can be formed by first depositing metal layer 36 on gallium arsenide substrate 10, followed by deposition of an insulating oxide layer 12, an overgrown semiconductor layer 16, another oxide layer 12', and another metal layer 36'. Overgrown semiconductor layer 16 is made semi-insulating by doping or proton bombardment, and width of the oxide and metal stripes is chosen to match the microwave propagation speed to the speed of the light wave in the guide. The light wave is confined by oxide layer 12 and thus is attenuated predominantly by looses in semiconductor layer 16, which can be made low. The microwave is guided by the metal layers and will not be greatly attenuated provided the metal is sufficiently conducting and the semiconductor is of high resistivity. This modulator is expected to have a significantly higher efficiency and higher frequency capability than any similar modulator heretofore reported.

Figure 11:
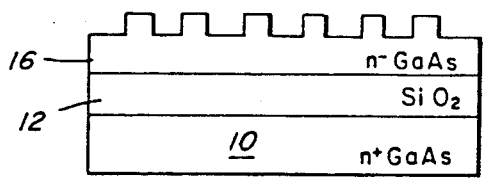
FIGS. 11 and 12 are cut-away side views of three-dimensional optical waveguides according to this invention which have been modified to provide grating structures useful as reflectors and couplers.
Figure 12:
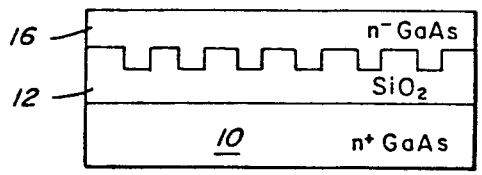

It is possible to form grating structures from the waveguides described herein which can be used as reflectors and couplers for applications in areas such as distributed feedback and distributed Bragg lasers and wavelength multiplexing schemes. Two such grating structures are illustrated in FIGS. 11 and 12, which can be formed by etching active gallium arsenide layer 16 after overgrowth or oxide layer 12 prior to overgrowth, respectively.

A geodesic lens can be made by forming a spherical depression into layer 16, instead of the dome or grating fingers of FIGS. 13–16.

Additionally, a variety of semiconductor waveguide lenses with shorter focal lengths than have been possible in conventional semiconductor structures can also be fabricated because of the high index discontinuity between the oxide and semiconductor overlayer. Such lenses, formed on planar substrates, include Luneburg lenses, formed by small spherical mounds, geodesic lenses formed by a spherical depression, and Fresnel lenses formed by a grating-type array. The integration of waveguide lenses could also lead to a number of signal processing applications including spectral analysis by utilizing the Fourier transform and focusing properties of such lenses.

Figure 13:
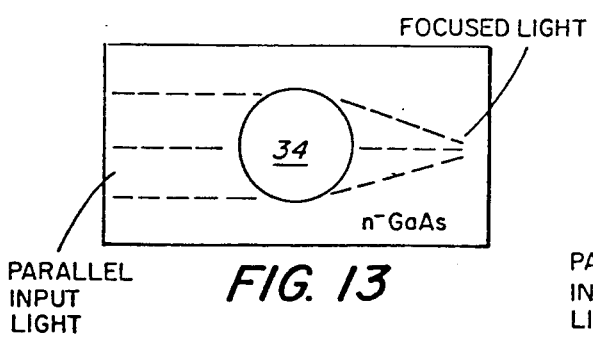
FIG. 13 is a top view of a Luneburg lens fabricated from a waveguide according to this invention.
Figure 14:
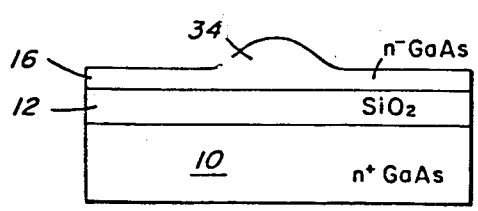
FIG. 14 is a cut-away side view of the Luneburg lens of FIG. 13.

FIGS. 13 and 14 illustrate a Luneburg lens formed from a waveguide as previously described. This lens can be formed by patterning active overgrown layer 16 to leave spherical dome 34, which functions to focus light propagating in layer 16, as illustrated.

Figure 15:
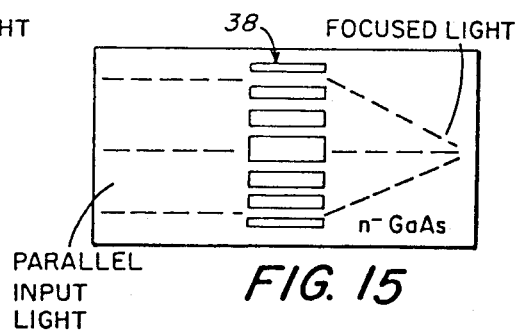
FIG. 15 is a top view of a Fresnel lens fabricated according to this invention.
Figure 16:
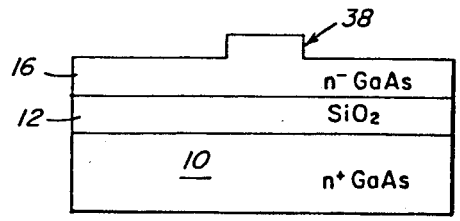
FIG. 16 is a cut-away side view of the Fresnel lens of FIG. 15.

FIGS. 15 and 16 illustrate a Fresnel lens formed by etching layer 16 to form the pattern of grating fingers 38. These grating fingers are often equal width and focus light propagating in layer 16, as illustrated.

The optical waveguides described herein also lend themselves to the integration of electrical and optical devices, even in a layered fashion on a common substrate. Some devices of special interest include an integrated A/D converter (including a laser interferometric modulator, detector and comparators), a data repeater and terminal (containing a detector, amplifier and laser) and switching circuits. A variety of diode laser and detector structures can also be fabricated in such devices. In addition to the grating structures previously described, single mode laser structures are also possible because of the large refractive index difference between the oxide and semiconductor which provides the necessary tight optical and electrical confinement.

INDUSTRIAL APPLICABILITY

This invention has industrial applicability in the fabrication of optical waveguides, particularly three-dimensional waveguides, and other guided wave devices.

EQUIVALENTS

Although most of the description above is limited to gallium arsenide, other semiconductors, including InP, Si, Ge, CdTe or their associated alloys (e.g. InGaAsp, GaAlAs, AgCdTe can also be employed in the fabrication of optical waveguides according to this invention. Similarly, other growth techniques for growing a single crystal semiconductor layer over an insulator could be employed instead of the vapor-phase epitaxial overgrowth technique described. Instead of the $AsCl_3$-Ga-$H_2$ vapor phase epitaxial overgrowth technique described, other epitaxial growth techniques including metal-organic epitaxy, molecular beam epitaxy, liquid phase epitaxy, vapor phase epitaxy using other chloride systems and pyrolitic decomposition could be used. Semiconductor-over-insulator structures could also be produced by techniques other than lateral overgrowth techniques without the use of slots in the insulator. Techniques for growing single crystal semiconductor layers directly on insulators include graphoepitaxy, laser or other thin film recrystallization techniques or growth of semiconductor layers on single crystal insulators by different epitaxial growth techniques (e.g. silicon on sapphire). Also, other insulators in addition to $SiO_2$ can be employed, such as glass, nitrides such as $Si_3N_4$, or other oxides. Further, there are a number of additional structures for guided wave devices, many of which could be fabricated from the basic device containing single crystal layer grown over an insulator. In addition, it is not necessary for the guide to be parallel to grid slots in the vapor phase epitaxy growth method. The guide could cross these slots, if the slots are smaller in width, low loss could be maintained.

Those skilled in the art will recognize other equivalents to the specific embodiments described herein, which equivalents are intended to be encompassed by the claims attached hereto.

We claim:
1. A combined optical and microwave guide, comprising:
   (a) a single crystal semiconductor substrate;
   (b) a first metal layer deposited upon said substrate;
   (c) a first insulator layer over said first metal layer;
   (d) an epitaxial layer of semiconductor overgrown on said insulator layer;
   (e) a second insulator layer on said epitaxial semiconductor layer; and
   (f) a second metal layer on said second insulator layer.

2. A three-dimensional optical waveguide structure for guiding light comprising:
   (a) a substrate;
   (b) a first insulator layer formed on said substrate;
   (c) light confining means comprising:
      (i) a single crystal semiconductor layer formed upon said insulator layer, the index of refraction of said insulator layer being less than the index of refraction of said semiconductor layer and the thickness of said semiconductor layer being sufficient to confine light in a first vertical direction by the boundary between the semiconductor layer and the insulator layer;
      (ii) a second insulator layer over said semiconductor layer for confining light in a second vertical direction by the boundary between said second insulator layer and said semiconductor layer;
      (iii) lateral light confining means comprising two side walls on said semiconductor layer extending towards but not reaching said first insulating layer to create an effective larger index of refraction within the region of said semiconductor layer within the two side walls of said three-dimensional optical waveguide to provide lateral confinement of said light.

3. A three-dimensional optical waveguide of claim 2 wherein said first insulator layer comprises an oxide.

4. A three-dimensional optical waveguide of claim 2 wherein said semiconductor layer comprises gallium arsenide.

5. A three-dimensional optical waveguide of claim 2 wherein said light confining means comprises a rib of single crystal semiconductor between two insulator layers.

6. A three-dimensional optical waveguide of claim 5 wherein said light confining means comprises an inverted rib.

7. A three-dimensional optical waveguide of claim 2 wherein said lateral light confining means comprises a gap between two metal strips formed over said semiconductor layer.

8. A three-dimensional optical waveguide of claim 2 wherein said lateral confining means comprises a ridge.

9. A three-dimensional optical waveguide of claim 2 wherein said light confining means comprises an embedded stripe.

10. A three-dimensional optical waveguide of claim 2 wherein said first insulator layer comprises an oxide and said second insulator layer comprises air.

11. A three-dimensional optical waveguide of claim 10 wherein said semiconductor layer comprises gallium arsenide.

12. The waveguide of claim 2 wherein a grating structure is formed on said waveguide which comprises a pattern of raised ridges on the outer surface of said semiconductor layer.

13. The waveguide of claim 2 wherein a grating structure is formed which comprises a series of depressed ribs extending from the inner surface of said semiconductor into said first insulator.

14. The waveguide device of claim 2 in which said semiconductor layer has an optical lens configuration thereon.

15. The device of claim 14 wherein said lens configuration comprises a Luneburg lens configuration.

16. The device of claim 14 wherein said lens configuration comprises a Fresnel lens configuration.

17. The device of claim 14 wherein said lens configuration comprises a geodesic lens configuration.

* * * * *